US008694966B2

(12) United States Patent
Gupta

(10) Patent No.: US 8,694,966 B2
(45) Date of Patent: Apr. 8, 2014

(54) IDENTIFYING TEST CASES TO BE RUN AFTER CHANGES TO MODULES OF A SOFTWARE APPLICATION

(75) Inventor: Ravi Kant Gupta, Ghaziabad (IN)

(73) Assignee: Oracle International Corporation, Redwood Shores, CA (US)

( * ) Notice: Subject to any disclaimer, the term of this patent is extended or adjusted under 35 U.S.C. 154(b) by 689 days.

(21) Appl. No.: 12/717,147

(22) Filed: Mar. 4, 2010

(65) Prior Publication Data

US 2011/0219359 A1    Sep. 8, 2011

(51) Int. Cl.
*G06F 9/44* (2006.01)

(52) U.S. Cl.
USPC ........... 717/124; 717/125; 717/126; 717/127; 717/128; 717/129; 717/130; 717/131; 717/132; 717/133; 717/134; 717/135

(58) Field of Classification Search
None
See application file for complete search history.

(56) References Cited

U.S. PATENT DOCUMENTS

| | | | | |
|---|---|---|---|---|
| 4,853,851 A | * | 8/1989 | Horsch | 714/38.1 |
| 5,278,979 A | * | 1/1994 | Foster et al. | 1/1 |
| 5,361,357 A | * | 11/1994 | Kionka | 717/151 |
| 5,581,696 A | * | 12/1996 | Kolawa et al. | 714/38.1 |
| 5,673,387 A | * | 9/1997 | Chen et al. | 714/38.1 |
| 5,761,408 A | * | 6/1998 | Kolawa et al. | 714/38.1 |
| 5,784,553 A | * | 7/1998 | Kolawa et al. | 714/38.1 |
| 5,978,585 A | * | 11/1999 | Crelier | 717/145 |
| 6,536,036 B1 | * | 3/2003 | Pavela | 717/125 |
| 7,203,835 B2 | * | 4/2007 | Multerer et al. | 713/168 |
| 7,596,778 B2 | * | 9/2009 | Kolawa et al. | 717/126 |
| 8,185,874 B2 | * | 5/2012 | Ball et al. | 717/124 |
| 8,185,881 B2 | * | 5/2012 | Brand et al. | 717/132 |
| 8,276,123 B1 | * | 9/2012 | Deng et al. | 717/125 |
| 8,286,149 B2 | * | 10/2012 | Dor et al. | 717/141 |
| 2006/0143596 A1 | * | 6/2006 | Miyashita et al. | 717/131 |
| 2008/0082968 A1 | * | 4/2008 | Chang et al. | 717/128 |
| 2008/0126867 A1 | * | 5/2008 | Pandarinathan et al. | 714/37 |
| 2008/0178154 A1 | * | 7/2008 | Basler et al. | 717/124 |
| 2008/0222609 A1 | * | 9/2008 | Barry et al. | 717/124 |

OTHER PUBLICATIONS

"JUnit+Jtest=Automated Test Case Design and Static Analysis", by Carson Ellsworth, Cynthia Dunlop, May 9, 2003.*
David Soul , "Clover", http://confluence.atlassian.com/pages/viewpage.action?pageId=185401674, Edited Date: Apr. 27, 2009, pp. 1-1.
"Brendan Humphreys", "Clover—Test Optimization", http://blogs.atlassian.com/developer/2008/11/stop_testing_so_much.html, Publication Date: Nov. 5, 2008. pp. 1-5.

(Continued)

*Primary Examiner* — Henry Tsai
*Assistant Examiner* — Jing-Yih Shyu
(74) *Attorney, Agent, or Firm* — Narendra Reddy Thappeta

(57) ABSTRACT

An aspect of the present invention facilitates identification of test cases to be run after changes to modules of a software application. In one embodiment, a reference data is generated by inspecting the instructions (static analysis) forming the modules of the software application, with the reference data specifying a corresponding set of modules in the application that are referenced by each of the modules in the application. The reference data is then examined to find a referencing set of modules which reference any of the changed modules either as immediate reference or multi-level reference through other modules. Test cases invoking any of the modules in the referencing set are identified as suitable test cases to be run.

22 Claims, 7 Drawing Sheets

(56) References Cited

OTHER PUBLICATIONS

"sourceforge.net", "EMMA—A Free Java Code Coverage Tool", http://emma.sourceforge.net/, Downloaded Circa: Oct. 15, 2009, pp. 1-1.

"Codework Limited", "JCOVER—Java Code Coverage Testing and Analysis" http://www.codework.com/JCover/product.html, Downloaded Circa: Oct. 15, 2009, pp. 1-1.

"Jason Bell", "JTEST 8.0—Product Review", http://java.sys-con.com/node/299985, Reviewed Date: Nov. 17, 2006, pp. 1-3.

"Cynthia", "JTEST—BUGS", http://forums.parasoft.com/index.php?showtopic=1229, Posted Date: Sep. 13 2006, pp. 1-1.

"Rick Grehan", "JTEST—Code Testing", Info World, http://www.infoworld.com/d/developer-world/jtest-continues-its-trek-toward-code-testing-supremacy-214?page=0,0, Publication Date: Oct. 6, 2006, pp. 1-2.

"Cynthia", "JTEST—Coverage", http://forums.parasoft.com/index.php?showtopic=1224, Posted Date: Sep. 13, 2006, pp. 1-1.

"Cynthia", "JTEST—How to Check If Code Meets Specifications", http://forums.parasoft.com/index.php?showtopic=1224, Posted Date: Sep. 13, 2006, pp. 1-1.

"MS.Cherapa Wannasuk", "Use Cases and Test Cases Relation in Testing Process", Downloaded Circa: Oct. 7, 2009, pp. 1-8.

* cited by examiner

350
```
package com.intex.sample;
public class E {
    public void doSomeThing (){
        D.doSomeStatic ();
    }
}
```

315
```
package com.intex.sample.test;
import junit.framework.*;
import com.intex.sample.*;
public class ATest extends public TestCase {
    public void test_dummy() {
        assertTrue (A.getClassName ()
            .equals("com.intex.sample.A"));
    }
    public static void main (String [] args){
        junit.swingui.TestRunner.run (ATest.class);
    }
}
```

380
```
com.intex.sample.Rx=
com.intex.sample.A
```

385
```
com.intex.sample.FuncTest=
com.intex.sample.A
```

360
```
package com.intex.sample;
import java.io.*;
import java.util.Properties;
public class Rx {
    public void doSomeA(){
        try{
            Class clazz = Class.forName (getClassNameFromFile ());
            Object a = clazz.newInstance ();
        } catch (Exception e) {
            e.printStackTrace ();
        }
    }
    private String getClassNameFromFile (String propFileName) throws IOException{
        FileInputStream fis = new FileInputStream (propFileName);
        Properties prop = new Properties ();
        prop.load (fis);
        return prop.getProperty ("reflectionclass");
    }
}
```

FIG. 3B

Figure 4:
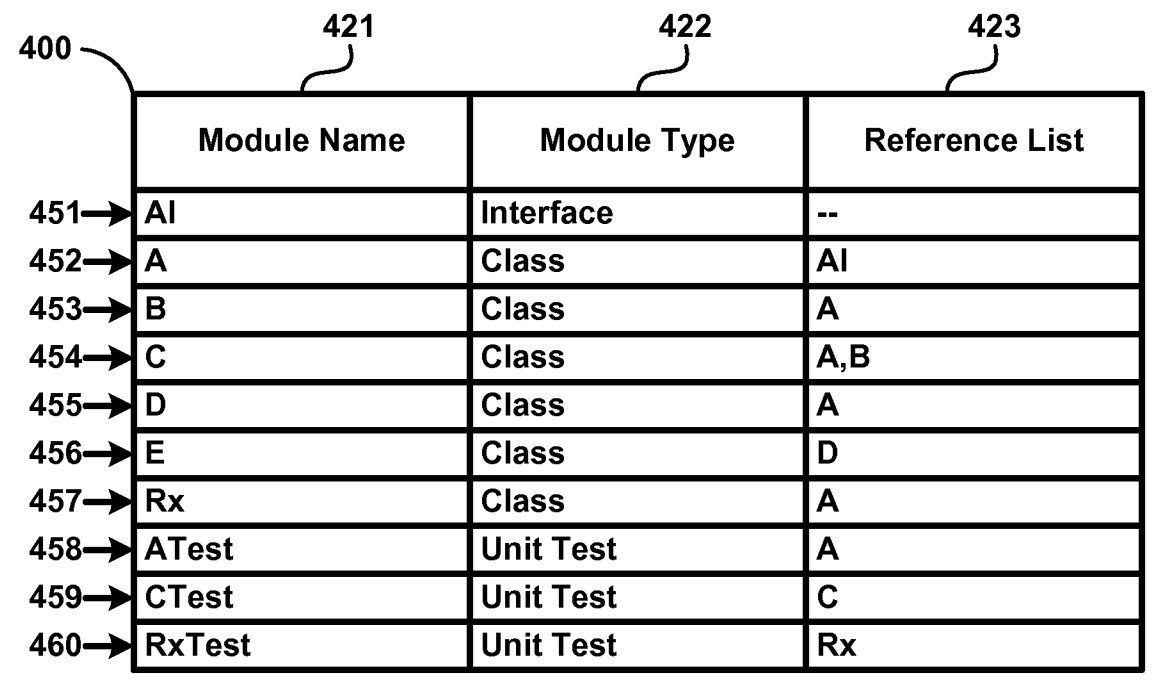

| Module Name | Module Type | Reference List |
|---|---|---|
| AI | Interface | -- |
| A | Class | AI |
| B | Class | A |
| C | Class | A,B |
| D | Class | A |
| E | Class | D |
| Rx | Class | A |
| ATest | Unit Test | A |
| CTest | Unit Test | C |
| RxTest | Unit Test | Rx |

IDENTIFYING TEST CASES TO BE RUN AFTER CHANGES TO MODULES OF A SOFTWARE APPLICATION

BACKGROUND OF INVENTION

1. Technical Field

The present disclosure relates to software testing, and more specifically to identifying test cases to be run after changes to modules of a software application.

2. Related Art

A software application is generally organized in the form of modules. Each module contains a corresponding set of instructions, which are together compiled, linked, etc., as is well known in the relevant arts. Modules are maintained in the form of source files, class files, JAR files, etc., as is also well known in the relevant arts.

There are often changes made to specific modules, with a view to meeting specific objectives. For example, during the development phase of the software application, developers may modify modules to add/modify functionality, and during maintenance phase, developers may modify modules to fix errors (referred to as bugs also) found after deployment of the software application.

It is often required to identify test cases to be run after such changes, typically to check whether the changes meet the objectives, as well as do not cause unintended consequences (e.g., create new errors, disrupting pre-existing functionality, etc.) in the operation of the software application. Each test case is designed to contain the inputs and logic to make operative specific desired portions of the corresponding modules, and to potentially check whether the output resulting from such operation satisfies a desired condition.

It is generally desirable that an optimum set of test cases be identified such that the desired checking is performed, as well as unneeded test cases are not run. Various aspects of the present invention address one or more of such requirements, as described below in further detail.

BRIEF DESCRIPTION OF THE DRAWINGS

Example embodiments of the present invention will be described with reference to the accompanying drawings briefly described below.

FIG. 4 depicts the manner in which reference data is generated and maintained in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention facilitates identification of test cases to be run after changes to modules of a software application. In one embodiment, a reference data is generated by inspecting the instructions (static analysis) forming the modules of the software application, with the reference data specifying a corresponding set of modules in the application that are referenced by each of the modules in the application. The reference data is then examined to find a referencing set of modules which reference any of the changed modules either as immediate reference or multi-level reference through other modules. Test cases invoking any of the modules in the referencing set are identified as suitable test cases to be run.

In an embodiment, the test cases are also treated as referencing modules of the specific modules invoked and the reference data accordingly reflects such a relationship. Accordingly, the referencing set of modules includes the test cases as well as the modules tested. Modules of test case type in the referencing set of modules accordingly form the suitable test cases to be run.

It may be appreciated that the reference data is generated by static analysis, that is inspection of the instructions forming the application, in contrast to dynamic analysis approaches such as execution traces, which require the modified application (formed by the merging of the changes with the software application) to be executed. Such static analysis is generally desirable in new development projects where code/design/requirements change frequently, and accordingly the generation of execution traces for every change adds substantial overhead to the development process.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
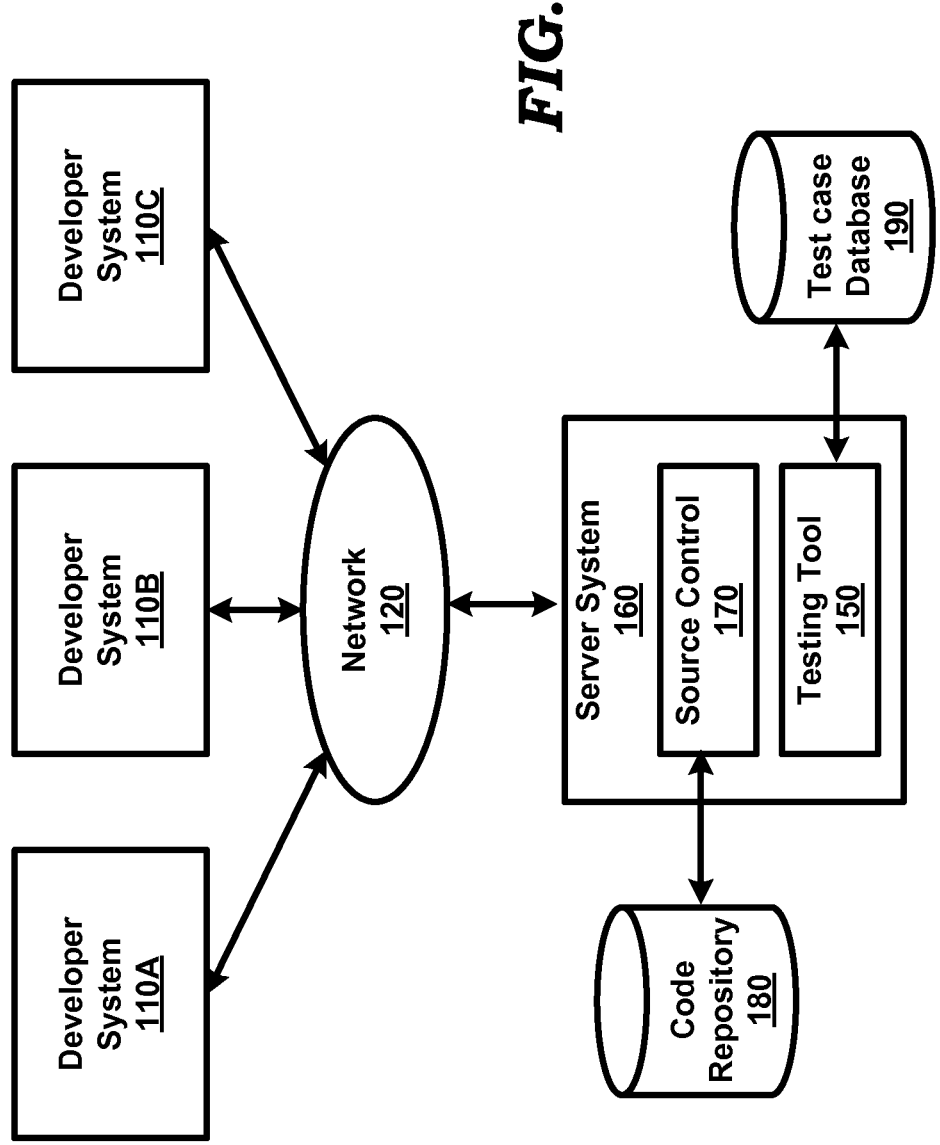
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing developer systems 110A-110C, network 120, server system 160 (shown containing testing tool 150 and source control 170), code repository 180, and test case database 190.

Merely for illustration, only representative number/type of systems is shown in FIG. 1. Many environments often contain many more systems, both in number and type, depending on the purpose for which the environment is designed. Each system/device of FIG. 1 is described below in further detail.

Network 120 provides connectivity between developer systems 110A-110C and server system 160. Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Each of developer systems 110A-110C represents a system such as a personal computer, workstation, mobile station, etc., used by users/developers to modify/change some of the modules forming a software application, for example, to add/modify a functionality of the application, fix errors/bugs uncovered in the application, etc. Accordingly, the developers may retrieve/store the desired modules (sought to be changed) from code repository 180 by sending appropriate requests (and receiving corresponding responses) to source control 170 executing in server system 160. After incorporating the desired changes in the modules, the developers may send requests for testing the changed modules to testing tool 150 executing in server system 160. The requests may be generated using appropriate interfaces.

Server system 160 represents a server system such as a web/application server executing code management/testing softwares (such as testing tool 150 and source control 170) capable of performing tasks requested by developers using one of developer systems 110A-110C. The softwares may perform the requested tasks on data maintained internally or on external data (stored in code repository 180 and test case database 190) and then send the result of performance of the tasks to the requesting developer system.

Source control 170 represents a code management software controlling access (to different developers) of the source code of modules maintained in code repository 180. Source control 170 also keeps track of the specific changes made to each of the modules by the different developers by maintaining multiple versions of the same module in code repository 180. Such tracking of changes may be required to ensure that the same module is not modified by different developers at the same time, to version the software application, for reverting back to earlier versions of the modules to undo certain changes, etc. The process of storing a module in code repository 180 (along with associated information such as the developer identifier, version number, etc.) is commonly referred to as "checking in", while the process of retrieving the module from code repository 180 is referred to as "checking out".

Typically, source control 170 enables multiple versions of a software application to be formed from code repository 180. There are generally several testing versions that can be formed, with each testing version having specific versions (e.g., by cutoff date, by functionalities) of the modules, as specified by a developer. Many of the modules can be untested in the testing version. Developers may indicate the specific modules which have been successfully tested and are ready to be merged into a production version. Accordingly, a production version (formed by source control 170) of the software application contains the latest successfully tested versions of the modules and is ready for deployment.

Each of code repository 180 and test case database 190 represents a non-volatile storage facilitating storage and retrieval of a collection of data by one or more softwares (such as testing tool 150 and source control 170) executing in server system 160. In particular, code repository 180 is used to maintain modules (forming a software application) in a source format that can be readily edited by developers. Code repository 180 may maintain multiple versions of the same module to keep track of the changes/modifications made to the same module.

It is assumed that code repository 180 contains modules of a software application developed according to test-driven design/development (TDD) approach of development. As is well known in the relevant arts, in this approach, test cases may be created first (according to a functional specification), and the modules are then developed, while ensuring that the test cases are satisfied. In such kind of development environment it may be important to make sure that any change to a module does not result in failure of test cases before merging of the modules. Therefore in such kind of development environment code merging is tightly coupled with execution of unit test cases, and merge is allowed only after successful execution of test cases.

Test case database 190 maintains the test cases used to test the functionalities of modules forming a software application. Each test case may specify a set of conditions to be checked during the execution of a corresponding module(s), with module determined to be working correctly ("pass") against a test case if all of the corresponding set of conditions are determined to be satisfied (true), and to be not working properly ("failed") otherwise. In general, a large number of tests cases are required to be created and run to determine that a software application is functioning correctly. Furthermore, test cases may be created to cover (test the functionality of) specific errors/bugs uncovered during (previous) testing.

Testing tool 150 represents a testing software/framework designed to run test cases maintained in test case database 190 (while executing the software application), and to determine the status (pass or fail) of each of the run test cases based on whether the corresponding set of conditions are satisfied or not. Accordingly, at least for the TDD approach, it may be necessary that testing tool 150 successfully run the test cases in test case database 190, before merging of the modules into the production version. It may be appreciated that the running of a large number of test cases before each merge may result in longer merge time. It may be accordingly desirable that an optimal set of test cases be identified and run.

In one approach, the specific/optimal set of test cases to be run is typically specified by a developer using one of developer systems 110A-110C. The developer may manually identify the optimal set by including the minimal number of test cases that covers testing of the changed software modules. As noted in the Background section, the running of the optimal set of test cases ensures that all the changes meet the desired objectives, as well as do not cause unintended consequences (e.g., create new errors, disrupting pre-existing functionality, etc.) in the operation of the software application.

Testing tool 150, provided according to several aspects of the present invention, identifies the test cases to be run after changes to modules of a software application by static analysis of the application. The term "static analysis" implies that the identification of the test cases is performed by inspecting the instructions contained in the modules forming the software application. Such static analysis of the modules in the application is in contrast to using dynamic approaches, such as execution traces, where the modified application, formed as the result of merging the changed modules with the other modules of the application maintained in code repository 180, is required to be executed.

The manner in which the optimal set of test cases to be run is identified using static analysis is described below with examples.

3. Identifying Tests to be Run by Static Analysis

Figure 2:
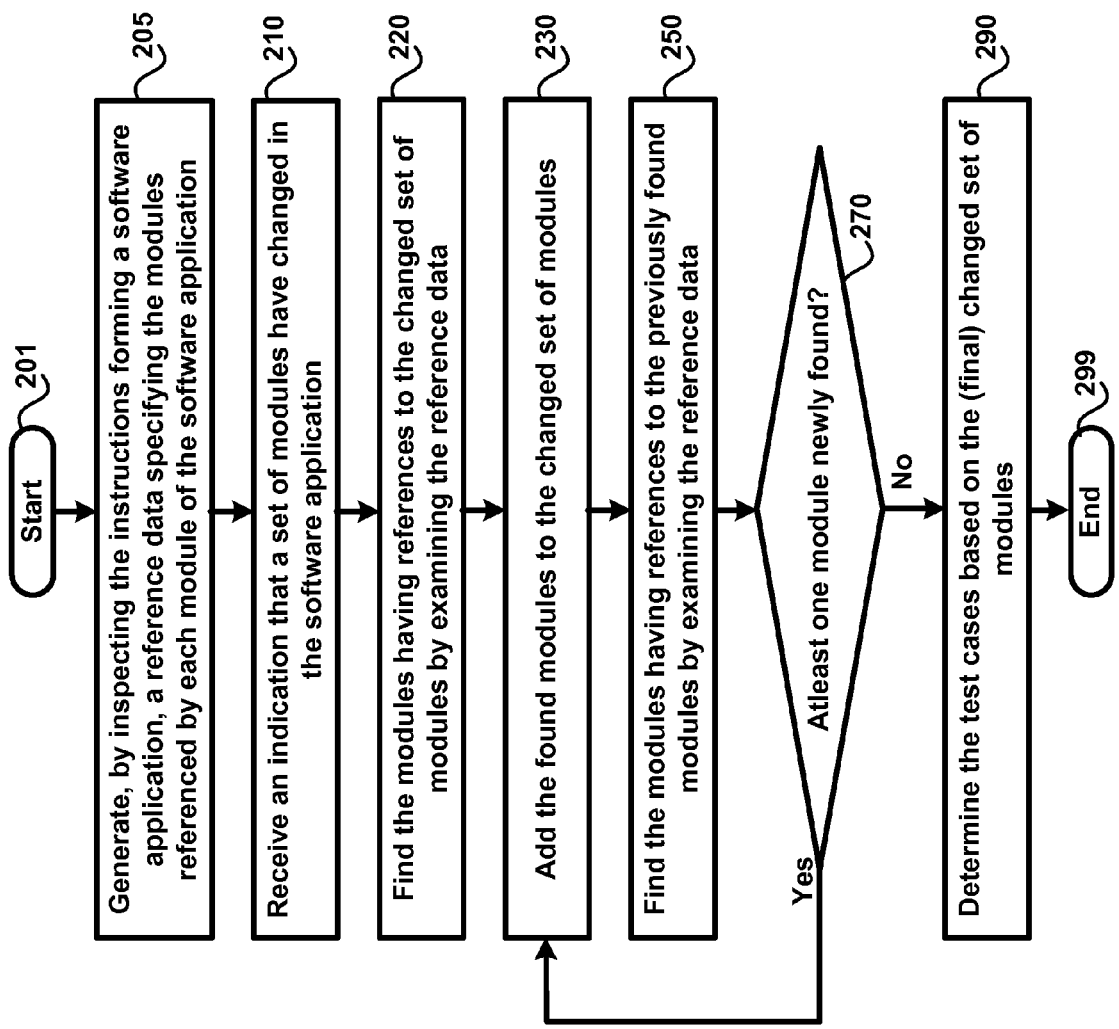
FIG. 2 is a flow chart illustrating the manner in which the tests to be run (after changes to modules of a software application) are identified according to an aspect of the present invention.

FIG. 2 is a flow chart illustrating the manner in which the tests to be run (after changes to modules of a software application) are identified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 205.

In step 205, testing tool 150 generates, by inspecting the instructions forming the software application, a reference/dependency data specifying the modules referenced by each module of the software application. A module (hereafter "referencing" module) is said to have a reference to another module (hereafter "referenced" module), if the referencing module uses at least one of the functionalities provided by the referenced module. Such functionalities include, for example, if the referencing module invokes a procedure in the referenced module, if the referencing module contains instructions that use data specified in the referenced module, etc. It may be appreciated that the referenced modules may be determined by parsing and inspecting the instructions forming the referencing module in the application.

However, in some scenarios, such determination may not be possible, for example, when a referencing module loads and uses a set of modules dynamically during run-time and the specific module that is referenced is determined based on external data (e.g., user input, configuration files, etc.). In such scenarios, additional data may be received from a developer indicating the specific modules that are "indirectly" referenced by each module of the application, and the reference data may be generated based on the additional data provided by the developer. In one embodiment described below, the additional data is provided in the form of properties files.

It may be appreciated that the reference data may be required to be generated only once for corresponding version in code repository 180 and that the reference data may not be dependent on the immediately changed modules (received below) if the reference data is made persistent. Accordingly, in one embodiment, testing tool 150 generates and stores reference data in a secondary storage in server system 160 in step 205.

However, in alternative embodiments, testing tool 150 may generate reference data based on inspection of the instructions forming the modules in code repository 180 as well as the changed set of modules before check-in/merge, and accordingly step 205 may be performed only after receiving the changed set of modules in step 210.

In step 210, testing tool 150 receives an indication that a set of modules in a software application is changed/modified. The indication (including identifiers of the changed modules) may be received from a developer using one of developer systems 110A-110C for testing the changes made to a software application. Alternatively, testing tool 150 may be designed to operate with source control 170 to identify the set of modules changed in the application, for example, by requesting a testing version, in response to receiving a request to test the software application from the developer.

In step 220, testing tool 150 finds the (first level of) modules having references to the changed set of modules (received in step 210) by examining the reference data (in one embodiment, after retrieving from a secondary storage). In other words, testing tool 150 checks the reference data for the modules that have been indicated to have at least one of the changed set of modules as a referenced module. Thus, testing tool 150 determines the modules that have immediate reference to any one of the changed set of modules.

In step 230, testing tool 150 adds the found (referencing) modules to the changed set of modules. The finding and addition of referencing modules follows from an understanding that any changes made to a referenced module may cause unintended consequences (e.g., create new errors, disrupting pre-existing functionality, etc.) in the immediately referencing modules, and accordingly an optimal set of test cases should not only test the changed modules but also any of the modules having a reference to the changed modules. Accordingly, in one embodiment, testing tool 150 determines the optimal/specific set of test cases based on the changed set of modules and the modules immediately referencing any one of the changed set of modules.

However, it may be appreciated that as per the above understanding, a second level of modules that have a reference to at least one of the newly found first level of modules (immediately referencing the changed modules) should also be tested to ensure no unintended consequences have been caused in second level of modules as well. Similar logic may be extended for a third level of modules referencing at least one of the second level of modules, a fourth level referencing at least one of third level, etc. Accordingly, steps 250, 270 (described below) and 230 are performed iteratively (as a loop) until all levels of modules referencing the changed set of modules are identified and included in the changed set based on the reference data.

Thus, in step 250, testing tool 150 finds the (next level of) modules having references to the previous (level of) found modules by examining the reference data and in step 270, testing tool 150 checks whether there at least one module is newly found in step 250. In other words, the finding of at least a single module indicates that the reference data needs to be searched for modules referencing the single module (and according requires the steps of 230 and 250 to be repeated), while the finding of no modules in step 250 indicates that all the levels of modules referencing the changed set of modules have been found.

Thus, in step 270, control passes to step 230 (for determining the next level of modules) if at least one module if found, and to step 290 (for determination of test cases) otherwise. It should be appreciated that the loop of steps 230, 250 and 270 operates to find the referencing modules that has a multi-level reference through other modules to any of the changed set of modules (of step 210).

In step 290, testing tool 150 determines the optimal/specific set of test cases based on the (final) changed set of modules containing the original set of modules changed by the developers (received in step 210) as well as all the modules (at different levels) referencing at least one of the original set of changed modules. The determination of the test cases based on the final changed set of modules may be performed in a known way.

In one approach, the test cases are determined based on a mapping data maintained by the developers of the modules/test cases. The mapping data specifies for each test case (specified for the application in test case database 190) the corresponding set of modules in the application tested/accessed by the test case. Testing tool 150 then determines the specific set of test cases to be run by checking whether each of the modules in the final changed set is specified in the mapping data, and including those test cases that are indicated to access/test at least of the modules in the optimal set. Such an approach may be used when the modules in the software application correspond to code files containing instructions according to a programming language, while each of the test cases is in the form of a test script containing instructions according to a scripting language different from the programming language.

In another approach, the test cases used to test a software application are also included as modules of the application prior to generation of the reference data. As such, it may be appreciated that the performance of step 210 ensures that the mapping data described above is also generated as part of the reference data, with the test cases indicated as referencing modules and the corresponding set of modules accessed/tested indicated as referenced modules. Furthermore, the performance of the steps of 220 through 270 ensures that the optimal set of test cases is also included in the final changed set of modules.

Accordingly, testing tool 150 determines the specific set of test cases to be run by checking the type of each of the modules in the final changed set, and including the modules of type test case in the optimal set. Such an approach may be used when the modules as well as the test scripts are specified according to the same programming language. The flow chart ends in step 299.

Thus, the set of test cases to be run after changes to modules of a software application are identified using static analysis of the application. The identified optimal set of test cases may then be run by testing tool 150 to determine whether the changes can be merged (if all test cases pass) or not. The failing of a test case may indicate that the changes originally done by the developer has not met the desired objectives or has caused unintended consequences (e.g., create new errors, disrupting pre-existing functionality, etc.) in at least some of the referencing modules. Thus, the developer may be required to make more changes (either to the original changed set of modules or the referencing modules) to the software application before checking in the modules to the code repository.

The description is continued illustrating the manner in which the steps of FIG. 2 are implemented in one embodiment.

4. Example Implementation

FIGS. 3A-3B, 4, and 5 together illustrate the manner in which the optimal set of test cases is identified by static analysis of a software application in one embodiment. The description is continued assuming that the software application contains one or more code files containing instructions according to Java™ programming language, and that each code file corresponds to a module of the application. Furthermore, it is assumed that test cases are specified as test scripts containing instructions according to the same Java programming language, and accordingly the software application is shown to contain both modules and test cases.

Figure 3:
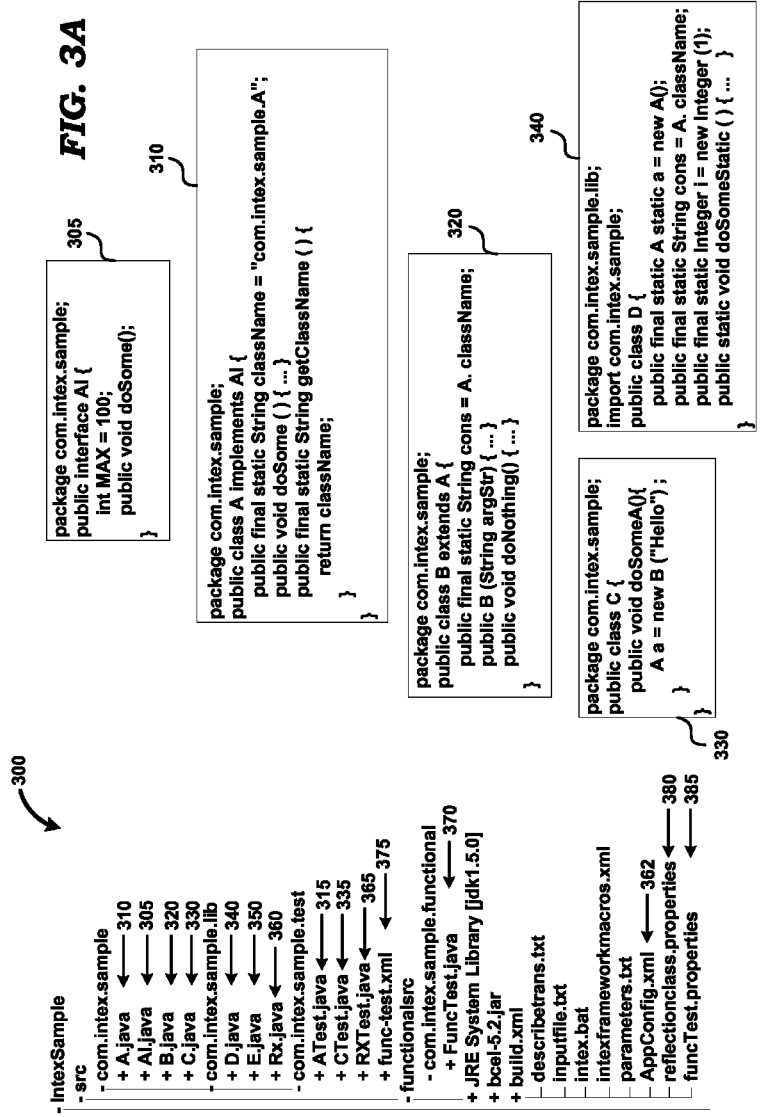
FIGS. 3A-3B together depicts the modules of a software application in one embodiment.

FIGS. 3A-3B together depicts the modules of a software application in one embodiment. Only a representative number of modules/test cases are shown as being part of the software application for conciseness. Furthermore, the content of each of the modules/test cases is shown to contain only a representative set of instructions for better understanding the features of the invention. However, the features of the present invention can be implemented for more number and/or type of modules/test cases and for more complex sets of instructions as will be apparent to one skilled in the relevant arts by reading the disclosure herein.

Application 300 is shown containing modules/code files "A.java" 310, "AI.java" 305, "B.java" 320, "C.java" 330, "D.java" 340, "E.java" 350 and "Rx.java" 360 as well as test cases "ATest.java" 315, "CTest.java" 335, "RxTest.java" 365 and "FuncTest.java" 370. Other files/modules such as "JRE System Library", "bcel-5.2.jar", etc. are also shown as being part of or being used by application 300.

The modules and test cases (hereafter referred to by their name without the ".java" extension) are shown to be organized in the form of a hierarchy as specified by a developer of application 300. Modules AI, A, B and C (305, 310, 320 and 330) are shown as belonging to one package "com.intex.sample" while modules D and E (340 and 350) are shown as belonging to another package "com.intex.sample.lib". The content of the modules and some of the test cases is also shown in corresponding numbered boxes in FIGS. 3A and 3B.

Thus, it may be observed that the content of module AI (305) is shown as defining an interface named "AI" and the content of module A (310) is shown as defining a class "A" as an implementation of the interface "AI". Accordingly, during the generation of the reference data, testing tool 150 identifies module A as a referencing module and module AI as a corresponding referred module. Similarly, based on the content of module B (320), in particular the instruction that class B extends class A, testing tool 150 identifies that module B has a reference to module A. With respect to module C (330), based on the instruction for creation of an instance of class B and its assignment to a variable of class A, testing tool 150 identifies module C as a referencing module and both modules A and B as the corresponding referenced modules. It may be observed that module D (from one package) has a reference to module A (belonging to another package).

Module Rx (360) is a referencing module which dynamically loads and uses modules (using reflection, well known in the relevant arts) specified in a configuration file named "AppConfig.xml" (362). Accordingly, testing tool 150 may require a developer to provide additional date indicating the specific modules that are "indirectly" referenced by the module Rx. Module 380 "reflectionclass.properties" specifies the additional data for the modules that use reflection to indirectly invoke other modules of the application in the format "referencing module=comma separated list of referred modules". Thus, the content of module 380 indicates that module Rx invokes module A. It may be observed that the content of module Rx (360) does not have any reference to module A indicating that the referencing is indirect, in contrast to direct referencing shown in the content of modules A, B, C, D and E.

Module ATest (315) depicts the content of a test case used for testing application 300. It may be observed that the test case contains instructions according to Java programming language. Such test cases may be provided by testing frameworks such as JUnit, well known in the relevant arts. It is noted that the ATest module is shown containing an assertTrue instruction that checks whether the class name of module A is equal to "com.intex.sample.A" with respect to module A. Thus, on running test case ATest (315), the condition is checked and the status of the test case is determined to be pass (if the condition is satisfied/true) and to be fail otherwise. Though only a simple/single condition is shown in the test case, typical test cases have more number of (as well as more complex type of) assertions/conditions that need to be checked during the execution of the application.

It is noted that module ATest (315) represents a unit test case which is designed to test the functionality of a single module in application 300. Similarly, the other unit test cases (such as CTest (335) and RxText (365)) may contain instructions to test other modules (such as C and Rx) in application 300 by invoking the modules, and thereby have a direct reference to the modules.

However, module FuncTest (370) represents a functional test case which tests the functionality of application 300, generally, via a user interface provided by application 300. The specific functional tests to be run for an application are specified in the configuration file "functest.xml" 375. Since functional tests do not directly invoke any of the modules of the application, it may be necessary that a developer provide a mapping data specifying for each functional test case, the corresponding set of modules tests/accessed in application 300.

Module 385 "FuncTest.properties" specifies the mapping data for the functional test case module FuncTest (370) in the format "test case name=comma separated list of referred modules". Thus, the content of module 385 indicates that module FuncTest (370) tests/indirectly invokes module A. In one embodiment, the mapping data for each functional test case is specified in a correspondingly named "properties" file (similar to module 385). However, in alternative embodiments, the mapping data for multiple functional tests may be specified in a single file. Furthermore, the mapping data may also specify (similar to the format noted above) the referenced modules for unit test cases such as modules ATest, CTest, RxTest, etc. as well. Such a mapping data may be desirable when the test cases contain instructions according to a scripting language different from the Java programming language.

Thus, application 300 is shown containing different modules such as code files and test cases. Testing tool 150 may then inspect the instructions forming application 300 to generate the corresponding reference data as described below with examples.

5. Generating Reference Data

Broadly, testing tool 150 generates the reference data by parsing the instructions in each of the modules forming the software application and searching for specific keywords/patterns corresponding to references between the modules. For example, testing tool 150 may parse and search for the keywords/patterns such as "class X implements Y", "class X extends Y", "new Y", "Y variablename=new Z", "Y.methodname( )", "variablename.methodname( )", etc., where X, Y and Z are module/class names and "class", "implements", "extends" and "new" are keywords in the Java programming language. On finding a match for one of the patterns, testing tool 150 adds data specifying the referencing module (for example, X) and the referenced modules (for example, Y and Z) in the reference data.

Thus, in module A, testing tool 150 may find a match for the pattern "class X implements Y" with X as A and Y as AI, and accordingly add data to the reference data indicating that the module A has a reference to module AI. Similarly in module C, testing tool 150 may find a match for the pattern "Y variable name=new Z" with Y as A and X as B, and add data indicating module C as a referencing module having a reference to the referenced modules A and B.

In one embodiment, the matching of the patterns is performed using a Byte Code Engineering Library (BCEL) which provides an application programming interface (API) for analyzing binary) Java class files (compiled format). Accordingly, the ".java" code files/modules are converted into the corresponding compiled class files and then inspected using the BCEL API to determine the reference among the modules. The BCEL API provides convenient methods for determining the interfaces/classes implemented/extended by a class, etc., and also for tracing fields, methods, classes, exceptions, etc. Furthermore, BCEL facilitates the inspections of the byte codes contained in the compiled class files for the generation of the reference data.

Thus, testing tool 150 generates the reference data specifying the modules referenced by each module of the application. As noted above, testing tool 150 may also inspect any additional data (such as "reflectionclass.properties" file 380) provided by the developers when generating the reference data. One specific format in which reference data may be generated and maintained in is described below with examples.

FIG. 4 depicts the manner in which reference data is generated and maintained in one embodiment. The reference data is shown as being maintained in a tabular format merely for convenience. However, in alternative embodiments, the reference data may be maintained using any convenient data format such as extensible markup language (XML) as will be apparent to one skilled in the relevant arts by reading the disclosure herein.

Table 400 specifies the reference data generated by testing tool 150 for application 300 based on the static analysis of the content of the modules (as shown in FIGS. 3A and 3B). Column 421 "Module Name" specifies a unique name of a referencing module in the application, column 422 "Module Type" specifies the type of each module, such as an interface, class, unit test case, etc. and column 423 "Reference List" specifies a list of referred modules for the corresponding referencing module.

Each of rows 451-460 specifies the reference data for a corresponding (referencing) module in application 300. For example, row 451 specifies that the module AI is of type interface and does not have references to any other module in the application (as indicated by the value "–"), while row 454 specifies that the module C is of type class and has references to modules A and B. Similarly, other rows specify the referenced modules for the corresponding referencing modules.

It may be appreciated that testing tool 150 may insert row 452 in table 400 in response to identifying the pattern "class X implements Y" with X as A and Y as AI in the content of module A (310) and row 454 in response to identifying the pattern "Y variable name=new Z" with Y as A and X as B in the content of module C (330). Furthermore, testing tool 150 may insert row 457 based on the inspection of the additional data shown in file 380 provided by a developer of application 300.

On receiving an indication that a set of modules in application 300 is changed/modified, testing tool 150 iteratively find all the levels of modules referencing at least one of the changed set of modules as described below with examples.

6. Finding Referencing Modules

Figure 5:
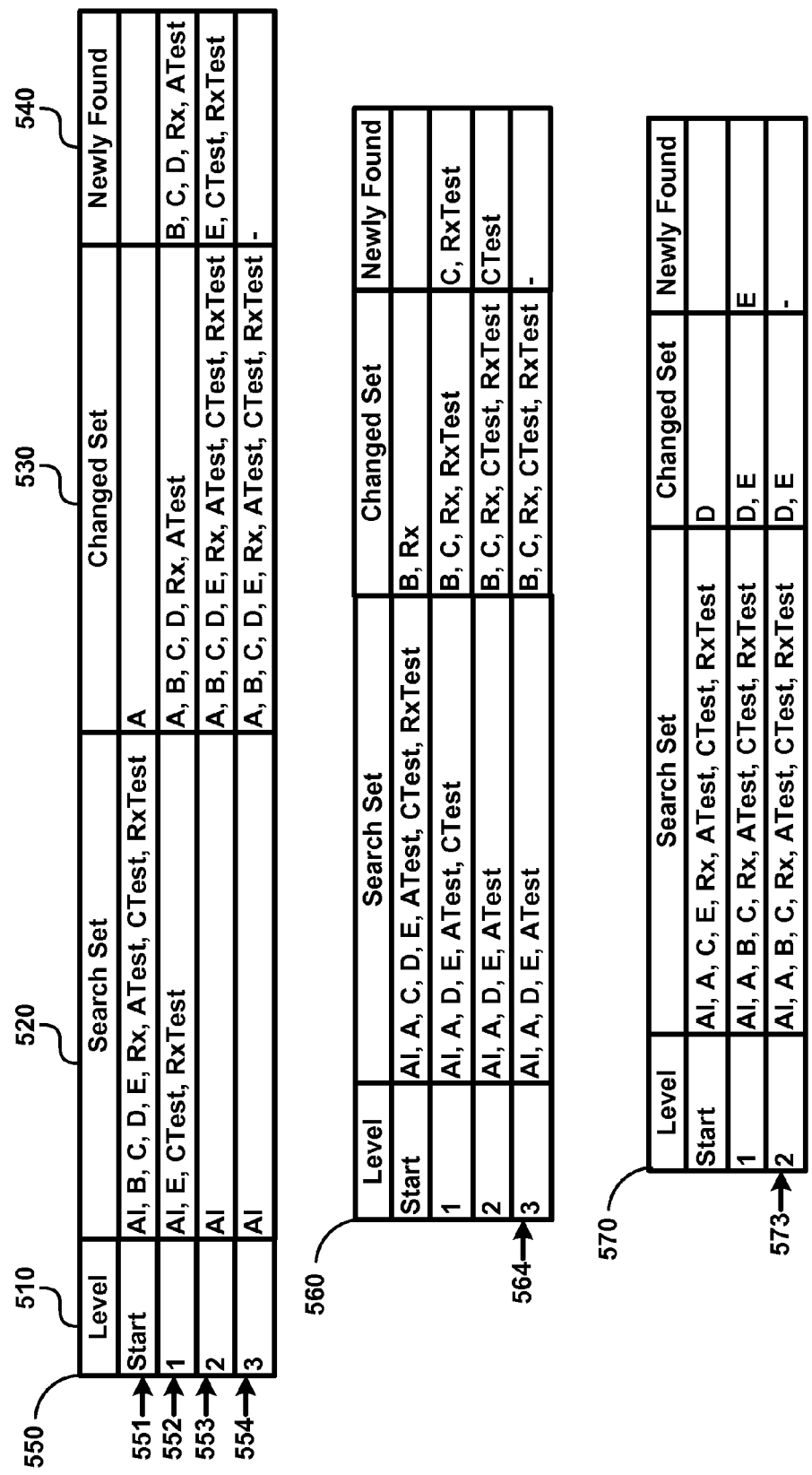
FIG. 5 illustrates the manner in which the referencing modules corresponding to different changed sets of modules are found in one embodiment.

FIG. 5 illustrates the manner in which the referencing modules corresponding to different changed sets of modules are found in one embodiment. Broadly, testing tool 150 on receiving a changed set of modules first identifies a search set containing the modules that are to be checked for references to the changed set of modules. For simplicity, the search set is started with all the modules of the application except the changed set of modules.

Testing tool 150 then finds the first level of modules having immediate references to at least one of the changed set of modules (based on the reference data) and adds the newly found modules to the changed set (steps 220 and 230 of FIG. 2). The modules added to the changed set are also removed from the search set for the convenience of finding the next level of modules. Testing tool 150 also performs iteratively the steps of 250, 270 and 230 of FIG. 2 to identify the subsequent levels of modules (again based on the same reference data) and adding the modules to the changed set (while removing the same modules from the search set), until no more modules are newly found.

In the below disclosure, the operation of the steps of FIG. 2 is shown in a tabular format for convenience, with column 510 specifying the level of modules, columns 520, 530 and 540 respectively specifying the contents of the search set, the changed set and the newly found modules (after performing step 250) at a corresponding level.

Table 550 illustrates the manner in which the set of referencing modules in application 300 is found for the changed set {A}. Testing tool 150 may find the referencing modules based on the reference data shown in FIG. 4 generated for application 300, prior to receiving the changed set of modules.

Row 551 indicates the contents of the sets at the start of iteration (before performing step 220 of FIG. 2). It may be observed that the search set is initialized to the set of all modules except module A (contained in the changed set), while the changed set contents is {A} and that are no newly found modules is indicated as blank. Row 552 specifies the contents of the sets after the performance of step 220 and 230, with the modules in the newly found column identified based on rows 453, 454, 455, 457 and 458 having the module A as a referenced module in column 423. The search set in row 552 is shown updated with the newly found modules removed, while the change set in row 552 is shown updated with the newly found modules added to the previous state (in row 551).

Row 553 specifies the contents of the sets after the performance of a first iteration of steps 250, 270, and 230, with the second level (as indicated in column 510) modules of newly found column identified based on rows 456, 459, and 460 having respectively the modules D, C and Rx as a referenced module in column 423. The search set and changed set in row 553 are shown appropriately updated with the newly found modules respectively removed and added to the sets.

Row 554 specifies the contents of the sets after a second iteration (in general, the iteration number is determined as one less than the level in column 510), and indicates that no modules were newly found in step 250 (as indicated by the "–" in column 540). Accordingly, the iteration is stopped and the contents of the changed set (in column 530) of row 554 represents the final changed set of modules {A, B, C, D, E, Rx, ATest, CTest, RxTest} containing the original changed set of modules {A} and all the modules referencing (at different levels) at least one of the original changed set.

Thus, the referencing modules in application 300 for a changed set of modules {A} is found based on the reference data of FIG. 4. Tables 560 and 570 respectively illustrate the manner in which the set of referencing modules in application 300 is found for the corresponding changed sets {B, Rx} and {D} with the corresponding final changed sets shown in rows 564 and 573.

Testing tool 150, after finding all the referencing modules and adding the referencing modules to the original changed set of modules to generate the final changed set of modules, determines the impact of the original changes in the software application based on the final changed set of modules as described below with examples.

7. Determining the Impact of the Changes

Testing tool 150 may determine the optimal/minimal set of test cases to be run covering the testing of the changed modules based on the final changed set of modules (step 290 of FIG. 2). As described above, testing tool 150 may determine the test cases based on a mapping data (such as file 385) provided by a developer specifying which of the modules of the application are accessed/tested by each of the test cases. Testing tool 150 may also determine the test cases based on the type of the modules, as described below.

Thus, for the changed set {A} of table 550, the final changed set shown in row 554 is inspected to identify the test cases ATest, CTest, and RxTest based on the type "Unit Test" of the modules (as indicated by column 422). The identification of the modules of the test case type may be performed in any convenient manner. For example, modules of test case type may be required to have the text "Test" appended to their names according to a coding convention, and as such, the test cases may be identified as the modules whose names end with the text "Test". Thus, for the final changes set shown in row 554, assuming that the above coding convention is followed, the test cases ATest, CTest and RxTest may be identified as the test cases.

Furthermore, testing tool 150 also identifies the test case FuncTest based on the mapping data of file 385, since the module A contained in the final changes set shown in row 554 is indicated to be invoked by the content of 385. For the format described above, testing tool 150 checks whether a module (such as A) contained in the final changed set of modules appears on the right hand side of the "=" sign, and then includes only those test cases (FuncTest) specified in the left hand side of the "=" sign if the module appears on the right hand side.

Thus, the minimal set of test cases for the changed set {A} is identified to be {ATest, CTest, RxTest, FuncTest}. Similarly, for the changed set {B, Rx} of table 560, the set of minimal test cases is identified to be {CTest, RxTest} based on the final changed set of modules shown in row 564.

It may be appreciated that in some scenarios, testing tool 150 may not be able to identify any test cases based on the final changed set of modules (in other words, the set of test cases is empty). According to an aspect of the present invention, testing tool 150 notifies a developer of the lack of test cases to cover testing of the original changed set of modules if the set of test cases is identified to be empty. Thus, for the changed set {D, E} of table 570, it may be observed that the final changed set of modules in row 573 does not have any modules of test types as well as the mapping data of 385 does not indicate any test cases. Accordingly, testing tool 150 may notify a developer of the lack of test cases to cover the changed set {D, E}.

In one embodiment, the software application is a multi-layered application with the modules belonging to a set of layers where the modules belonging to each layer maintained in a corresponding code repository. In such an embodiment, if the changed set of modules belongs to a first layer, testing tool 150 checks whether the referencing set of modules includes a second module belonging to a second layer contained in the set of layers where the second layer is different from the first layer. Testing tool 150 then notifies a developer of an interface mismatch between the first layer and the second layer if there a second module is present, with the interface mismatch corresponding to changes made to a module contained in the final changed set of modules referenced by the second module. Such a notification enables the developer to fix the interface mismatch before integration of modules in the different layers from different code repositories.

It may be appreciated that testing tool 150 may store the reference data in a secondary/non-volatile storage after generation and then retrieve the stored reference data for finding the referencing modules. Such storage and retrieval facilitates the checking for interface mismatch to be performed without requiring inspecting of the instructions forming the modules in multiple layers (and maintained in different code repositories).

In another embodiment, the modules forming the software application are divided into a set of packages (such as "com.intex.sample" and "com.intex.sample.lib" noted above), with each package related to a corresponding functionality provided by the software application. In such an embodiment, if the changed set of modules is contained in a first package related to a first functionality provided by the application, testing tool 150 checks whether the referencing set of modules includes a third module belonging to a third package contained in the set of packages, where the third package is different from the first package and is related to a third functionality different from the first functionality. Testing tool 150 then notifies a code reviewer to review the impact of the first functionality on the third functionality if such a third module is present.

It should be appreciated that the features described above can be implemented in various embodiments as a desired combination of one or more of hardware, executable modules, and firmware. The description is continued with respect to an embodiment in which various features are operative when executable modules are executed.

8. Digital Processing System

Figure 6:
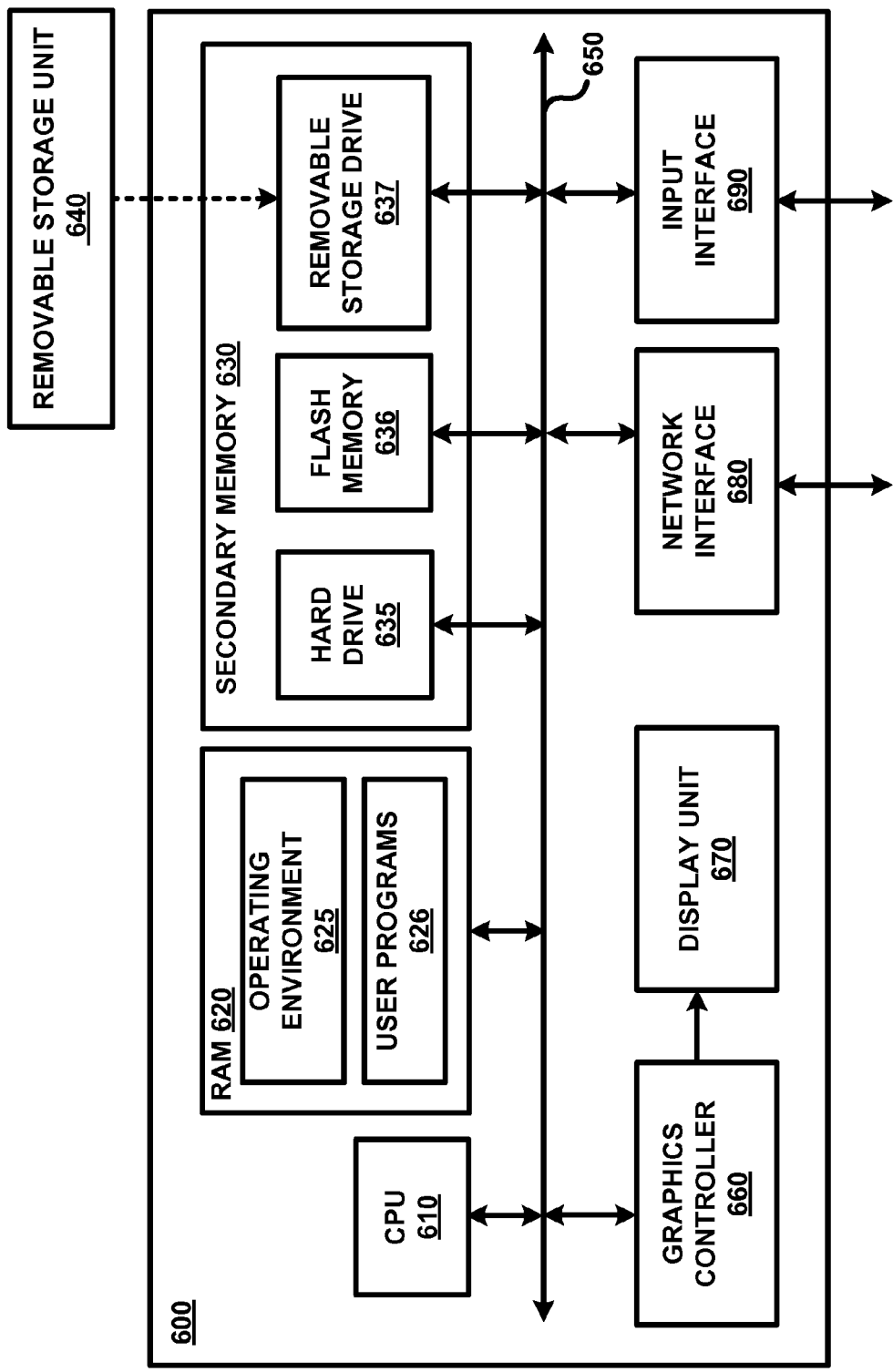
FIG. 6 is a block diagram illustrating the details of a digital processing system in which various aspects of the present invention are operative by execution of appropriate executable modules.

FIG. 6 is a block diagram illustrating the details of digital processing system 600 in which various aspects of the present invention are operative by execution of appropriate executable modules. Digital processing system 600 may correspond to server system 160.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting operating environment 625 and/or other user programs 626 (such as testing/production versions of the software applications, code management/testing softwares, etc.). In addition to operating environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems connected to the network.

Secondary memory 630 may contain hard drive 635, flash memory 636, and removable storage drive 637. Secondary memory 630 may store the data (for example, portions of the reference data of FIG. 5, portions of the additional data/mapping data provided by developers, etc.) and software instructions (which when operative perform the steps of FIG. 2 and cause the states shown in FIG. 5), which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of testing an application after changes to any of a plurality of modules forming said application, said method comprising:

receiving an indication that a set of modules have changed, wherein said set of modules is contained in said plurality of modules;

determining a final set of modules by static analysis of said plurality of modules, said final set of modules including said changed set of modules and a referencing set of modules of said plurality of modules, wherein each module of said referencing set of modules references at least one of said changed set of modules either as immediate reference or multi-level reference through other modules, said final set of modules not including any module by virtue of being referenced by any of said changed set of modules, wherein said application contains a first module which is immediately referenced by one of said changed set of modules, wherein said determining does not include said first module in said referencing set of modules;

identifying a set of test cases to cover testing of all of said final set of modules, wherein said identifying includes a test case in said set of test cases only if the test case operates to test at least one of said final set of modules such that said set of test cases is a minimal set that covers testing of all of said final set of modules; and running said set of test cases with said changed set of modules merged into said plurality of modules, wherein said determining by said static analysis comprises:

generating a reference data by inspecting the instructions forming said plurality of modules, wherein said reference data specifies for each module a corresponding set of modules contained in said plurality of modules that are referenced by said module;

finding, in response to said receiving, said referencing set of modules by examining said reference data; and adding said referencing set of modules to said changed set of modules to create said final set of modules.

2. The method of claim 1, wherein said plurality of modules are maintained in a code repository, and wherein said determining is performed before merging said changed set of modules with said application in said code repository.

3. The method of claim 1, further comprising:
checking whether said set of test cases is empty; and
notifying a developer of the lack of test cases to cover testing of said changed set of modules upon said checking determining said set of test cases to be empty.

4. The method of claim 1, wherein said generating further comprises:

receiving, from a developer, additional data indicating that a first module is indirectly referenced by a second module, said first module and said second module being contained in said plurality of modules, wherein said generating generates said reference data to specify that said first module is referenced by said second module based on said additional data.

5. The method of claim 1, wherein said finding comprises:
examining said reference data to identify a second set of modules, wherein each of said second set of modules has an immediate reference to at least one of said changed set of modules;

performing iteratively said examining to identify a plurality of levels of modules based on said second set of modules, wherein said second set of modules is considered as a first level of modules and each of a next level of modules has reference to at least one of a previous level of modules, said next level of modules and said previous level of modules being contained in said plurality of modules; and including said second set of modules and said plurality of levels of modules in said referencing set of modules.

6. The method of claim 1, wherein a plurality of test cases are used to test said application, said method further comprising:

maintaining a mapping data specifying a corresponding one of a plurality of subsets of modules tested by each of said plurality of test cases, said plurality of subsets of modules being contained in said plurality of modules, wherein said identifying said set of test cases for a first module contained in said final set of modules comprises:

checking whether said first module is contained in said plurality of subsets of modules; and including a first test case in said set of test cases only when said checking determines that said first module is contained in the corresponding subset of modules, said first test case being contained in said plurality of test cases.

7. The method of claim 6, wherein each of said plurality of modules corresponds to a code file containing instructions according to a programming language and each of said plurality of test cases corresponds to a test script containing instructions according to a scripting language, wherein said scripting language is different from said programming language.

8. The method of claim 1, wherein a plurality of test cases are used to test said application, wherein said plurality of test cases are also included in said plurality of modules forming said application, wherein said identifying comprises:

checking whether each of said final set of modules is of a test case type; and including the modules that are of said test case type in said set of test cases.

9. The method of claim 8, wherein each of said plurality of modules including said plurality of test cases corresponds to a code file containing instructions according to a programming language.

10. The method of claim 1, wherein said application is a multi-layered application with said plurality of modules belonging to a set of layers, wherein the modules for each of said set of layers is maintained in different code repositories, wherein said changed set of modules belong to a first layer contained in said set of layers, said method comprising:

checking, after said finding, whether said referencing set of modules includes a second module belonging to a second layer contained in said set of layers, said second layer being different from said first layer; and notifying a developer of an interface mismatch between said first layer and said second layer upon said checking determining the existence of said second module, wherein said interface mismatch corresponds to changes made to a first module contained in said final set of modules referenced by said second module, whereby said developer is enabled to fix said interface mismatch before integration of said set of layers from different code repositories.

11. The method of claim 10, further comprising storing said reference data in a secondary storage after said generating,
wherein said finding finds said referencing set of modules after retrieving said reference data from said secondary storage without requiring said inspecting of the instructions forming the modules in layers other than said first layer.

12. The method of claim 1, wherein said plurality of modules forming said application is divided into a set of packages, with each package related a corresponding functionality provided by said application, wherein said changed set of modules is contained in a first package contained in said set of packages, said first package being related to a first functionality provided by said application, said method comprising:
checking whether said referencing set of modules includes a third module belonging to a third package contained in said set of packages, said third package being different from said first package and being related to a third functionality different from said first functionality;
notifying a code reviewer to review the impact of said first functionality on said third functionality upon said checking determining the existence of said third module.

13. A system facilitating testing of an application in relation to changes to a set of modules contained in a plurality of modules forming said application, said system comprising:
a processor;
a random access memory (RAM); and
a non-transitory machine readable medium to store a first set of instructions and a second set of instructions, wherein said first set of instructions when retrieved into said RAM and executed by said processor form said application, said second set of instructions when retrieved into said RAM and executed by said processor form a testing tool designed to perform the actions of:
determining a final set of modules by static analysis of said plurality of modules, said final set of modules including said changed set of modules and a referencing set of modules of said plurality of modules, wherein each module of said referencing set of modules references at least one of said changed set of modules either as immediate reference or multi-level reference through other modules,
said final set of modules not including any module by virtue of being referenced by any of said changed set of modules,
wherein said application contains a first module which is immediately referenced by one of said changed set of modules, wherein said determining does not include said first module in said referencing set of modules;
identifying a set of test cases to cover testing of said final set of modules, wherein said identifying includes a test case in said set of test cases only if the test case operates to test at least one of said final set of modules such that said set of test cases is a minimal set that covers testing of all of said final set of modules; and
running said set of test cases with said changed set of modules merged into said plurality of modules,
wherein said determining by said static analysis comprises:
generating a reference data by inspecting the instructions forming said plurality of modules, wherein said reference data specifies for each module a corresponding set of modules contained in said plurality of modules that are referenced by said module;
finding, in response to said receiving, said referencing set of modules by examining said reference data; and
adding said referencing set of modules to said changed set of modules to create said final set of modules.

14. The system of claim 13, wherein said plurality of modules are maintained in a code repository, and wherein said testing tool performs said determining before merging said changed set of modules with said application in said code repository.

15. The system of claim 13, wherein for said generating, said testing tool further performs the actions of:
receiving, from a developer, additional data indicating that a first module is indirectly referenced by a second module, said first module and said second module being contained in said plurality of modules,
wherein said generating generates said reference data to specify that said first module is referenced by said second module based on said additional data.

16. The system of claim 13, wherein for said finding, said testing tool performs the actions of:
examining said reference data to identify a second set of modules, wherein each of said second set of modules has an immediate reference to at least one of said changed set of modules;
performing iteratively said examining to identify a plurality of levels of modules based on said second set of modules, wherein said second set of modules is considered as a first level of modules and each of a next level of modules has reference to at least one of a previous level of modules, said next level of modules and said previous level of modules being contained in said plurality of modules; and
including said second set of modules and said plurality of levels of modules in said referencing set of modules.

17. The system of claim 13, wherein a plurality of test cases are used to test said application, said testing tool further performing the actions of:
maintaining a mapping data specifying a corresponding one of a plurality of subsets of modules tested by each of said plurality of test cases, said plurality of subsets of modules being contained in said plurality of modules,
wherein for said identifying said set of test cases for a first module contained in said final changed set of modules, said testing tool performs the actions of:
checking whether said first module is contained in said plurality of subsets of modules; and
including a first test case in said set of test cases only when said checking determines that said first module is contained in the corresponding subset of modules, said first test case being contained in said plurality of test cases.

18. The system of claim 13, wherein a plurality of test cases are used to test said application, wherein said plurality of test cases are also included in said plurality of modules forming said application, wherein for said identifying, said testing tool performs the actions of:
checking whether each of said final set of modules is of a test case type; and
including the modules that are of said test case type in said set of test cases.

19. A non-transitory machine readable medium storing one or more sequences of instructions for causing a system to facilitate identifying of test cases to be run after changes to an application, wherein execution of said one or more sequences of instructions by one or more processors contained in said system causes said system to perform the actions of:

receiving a plurality of modules for said application, said plurality of modules including a first set of modules implementing a corresponding functionality of said application, and a second set of modules representing test cases to test to said first set of modules, wherein each of said set of modules is designed to test corresponding one or more modules of the first set of modules by referencing said corresponding one or more modules;

generating a reference data by inspecting the instructions forming said plurality of modules, wherein said reference data specifies for each module, including said second set of modules, a corresponding set of modules contained in said plurality of modules that are referenced by said module;

receiving an indication that a set of modules have changed, wherein said set of modules is contained in said plurality of modules;

finding, based on said reference data and upon said receiving of said indication, a referencing set of modules which reference any of said changed set of modules either as immediate reference or multi-level reference through other modules, wherein said referencing set of modules contains at least one module by said immediate reference and at least one module by said multi-level reference, said referencing set of modules being contained in said plurality of modules, wherein said changed set of modules and said referencing set of modules together form a final set of modules; and determining those modules of said final set of modules that are contained in said second set of modules as a set of test cases to cover testing of said final set of modules, wherein said final set of modules does not include any module by virtue of being referenced by any of said changed set of modules, wherein said application contains a first module which is immediately referenced by one of said changed set of modules, wherein said finding does not include said first module in said referencing set of modules, wherein said set of test cases is a minimal set that covers testing of all of said final set of modules.

20. The non-transitory machine readable medium of claim 19, wherein said generating comprises one or more instructions for:

receiving, from a developer, additional data indicating that a first module is indirectly referenced by a second module, said first module and said second module being contained in said plurality of modules, wherein said generating generates said reference data to specify that said first module is referenced by said second module based on said additional data.

21. The non-transitory machine readable medium of claim 19, wherein said finding comprises one or more instructions for:

examining said reference data to identify a first level of modules, wherein each of said first level of modules has an immediate reference to at least one of said changed set of modules;

performing iteratively said examining to identify a plurality of levels of modules based on said first level of modules, wherein a next level of modules has reference to at least one of a previous level of modules; and including said first level of modules and said plurality of levels of modules in said referencing set of modules, wherein said first level of modules, said next level of modules and said previous level of modules are contained in said plurality of modules.

22. The non-transitory machine readable medium of claim 19, wherein said second set of modules is of a test case type, wherein said determining comprises one or more instructions for:

checking whether each of said final set of modules is of said test case type; and including only those modules of said final set of modules that are of said test case type in said set of test cases.

* * * * *